United States Patent [19]

Barnes et al.

[11] Patent Number: 5,572,574
[45] Date of Patent: Nov. 5, 1996

[54] CORDLESS TELEPHONE REGISTRATION METHOD

[75] Inventors: Nigel E. Barnes, Basingstoke; Colin Corbett, Nottingham, both of United Kingdom

[73] Assignee: GPT Limited, United Kingdom

[21] Appl. No.: 400,501

[22] Filed: Mar. 7, 1995

Related U.S. Application Data

[63] Continuation of Ser. No. 166,811, Dec. 14, 1993, abandoned, which is a continuation of Ser. No. 761,832, filed as PCT/GB90/01739, Nov. 12, 1990, abandoned.

[30] Foreign Application Priority Data

Nov. 11, 1989 [GB] United Kingdom ................. 8925552

[51] Int. Cl.⁶ .................. H04M 11/00; H04Q 7/00
[52] U.S. Cl. .................. 379/61; 379/58; 379/59; 379/60; 379/62; 455/33.1
[58] Field of Search .................. 379/58, 59, 60, 379/61, 62; 455/33.1

[56] References Cited

U.S. PATENT DOCUMENTS

| | | | |
|---|---|---|---|
| 4,646,345 | 2/1987 | Zdunek et al. | 379/62 |
| 4,682,351 | 7/1987 | Makino | 379/62 |
| 4,796,291 | 1/1989 | Makino | 379/62 |
| 4,802,201 | 1/1989 | Yoshizawa | 379/62 |
| 4,833,702 | 5/1989 | Shitara et al. | 379/60 |
| 4,852,148 | 7/1989 | Shibata et al. | 379/59 |
| 4,860,337 | 8/1989 | Shimura | 379/61 |
| 4,864,599 | 9/1989 | Saegusa et al. | 379/62 |
| 4,875,231 | 10/1989 | Hara et al. | 379/61 |
| 4,879,740 | 11/1989 | Nagashima et al. | 379/61 |
| 4,939,785 | 7/1990 | Murata et al. | 379/61 |
| 5,077,790 | 12/1991 | D'Amico et al. | 379/62 |

*Primary Examiner*—Wellington Chin
*Assistant Examiner*—Vijay Shankar
*Attorney, Agent, or Firm*—Kirschstein, et al.

[57] ABSTRACT

A method of on-air registration of a cordless telephone handset with a base station, includes the steps of: arming the handset so that it can indicate that it wants to register with a base station; arming the network to enable it to accept the registration request from the handset; activating the handset to start transmitting link request words; causing the base station and the associated network to determine that the link set-up is to be used for registration purposes, causing the base station to use the handset's identity to decide if that handset has a pending registration request, and transferring into the handset the registration details over the established link.

5 Claims, 1 Drawing Sheet

CORDLESS TELEPHONE REGISTRATION METHOD

This is a continuation of application Ser. No. 08/166,881, filed on Dec. 16, 1993, abandoned, which is a continuation application of prior U.S. Ser. No. 07/761,832, filed as PCT/GB90/01739, Nov. 12, 1990, now abandoned.

BACKGROUND OF THE INVENTION

1. Field of the Invention

The present invention relates to a method of on air registration of a cordless telephone with a base station.

The invention finds application in the second generation of cordless telephones, commonly known as (CT2) in which the transmission method employed is called 'burst mode' transmission.

2. Description of Related Art

In burst mode transmission, the information to be transmitted is accumulated by a unit's transmitter, and transmitted in a 'burst' to a receiving unit, after which the unit's transmitter is switched off, and the unit's receiver is switched on. The receiver is then expecting to receive a similar burst from the other unit. These bursts are transmitted and received by the two units on the same radio frequency.

Under the existing situation, if the user wishes to gain access to, for example a telepoint network, a user has to register to at least that network. The transmissions between the user and the network through free space is by virtue of a radio link used in accordance with what is commonly called the Common Air Interface. The Common Air Interface is a published document HPT1375 and is published by the Department of Trade and Industry, the last publication being May 1989. The Common Air Interface sets down the conditions which all users have to meet in order to communicate with their respective base stations. Each base station in the telepoint network is capable of receiving communications from a number of hand held user stations, and therefore, providing the user is within sufficient range to enable radio communication to occur between the user's handset and the base station, the base station can handle the call. The base station would typically interface with the public switched telephone network.

Registration of a handset to a network is achieved by using values of a link identification code.

The information that is loaded into the handset consists of:

1) 16 bits of a link identification code value, which is used when establishing link to identify the network or service required, 2) 64 bits of a personal identification number value, which is an encrypted binary number, which together with the handset's own identity may serve to identify the handset and/or user with greater security. This personal identification number value is derived from a variety of numbers, and may include the handset's unique identity number, 3) a nine bit value which is used to identify the home network, that is the network operator from whom the data is obtained, 4) a 3 bit value, which Indicates to the network the class of service available to the handset, and 5) up to 20 binary coded decimal digits (BCD) which could be used as an account number to which the call charges is to be billed.

All of the above data needs to be entered into the handset, which hitherto has been done manually. This results in a digit sequence to be dialed in to the handset by the user wishing to register with a network. The number of key strokes to be entered can be up to 66 digits, which is likely to be an error prone and tedious task for the user.

An additional number which is used during authentication for access to a telepoint network is also required, which is a four bit binary number (ZAP). This number is not entered by the user and is specifically barred from being entered by the user. This value can however be altered by messages over the radio link.

The use of the ZAP value causes some problems as it is one of the numbers used to calculate the personal identification number and in doing so the network has to assume a value for ZAP which can have one of 16 values. When a newly registered user tries to access a network for the first time, the authentication is likely to fail, because the assumed ZAP value is likely to be different from the actual value in the handset. This means that the network will have to instruct the handset to alter the ZAP value up to 15 times in order for authentication to be ultimately successful. This adds to network complexity and is a relatively time consuming task.

In summary, there are two problems associated with the existing method, the long, tedious and potentially error prone manual entry of data, and the increased network complexity due to the lack of knowledge of the ZAP values.

SUMMARY OF THE INVENTION

Therefore, it is an object of the present invention to provide a method which overcomes these problems in an efficient manner, which requires less network complexity and is substantially less error prone.

According to the present invention there is provided a method of on-air registration of a telephone handset with a base station, the method comprising the steps of:

arming the handset so that it can indicate that it wants to register with a base station, arming the network to enable it to accept the registration request from the handset, activating the handset to start transmitting link request code words, causing the base station and the associated network to determine that the link set up is to be used for registration purposes, causing the base station to use the handset's identity to decide if that handset has a pending registration request, transferring into the handset the registration details over the established link.

According to an aspect of the present invention the handset is armed by first operating a proprietary key sequence and entering into the handset link identification values for indicating that registration is requested.

According to yet another aspect of the invention, the network is armed by being given the handset's own unique identity number, and after a link has been properly initialized the handset sends a feature activation message, which is recognised by the base station which causes the base station to determine that the handset wants to register, and the base station and associated network using the handset's identity number causes the registration details to be transferred to the handset.

DETAILED DESCRIPTION OF THE PREFERRED EMBODIMENT

Figure 1:
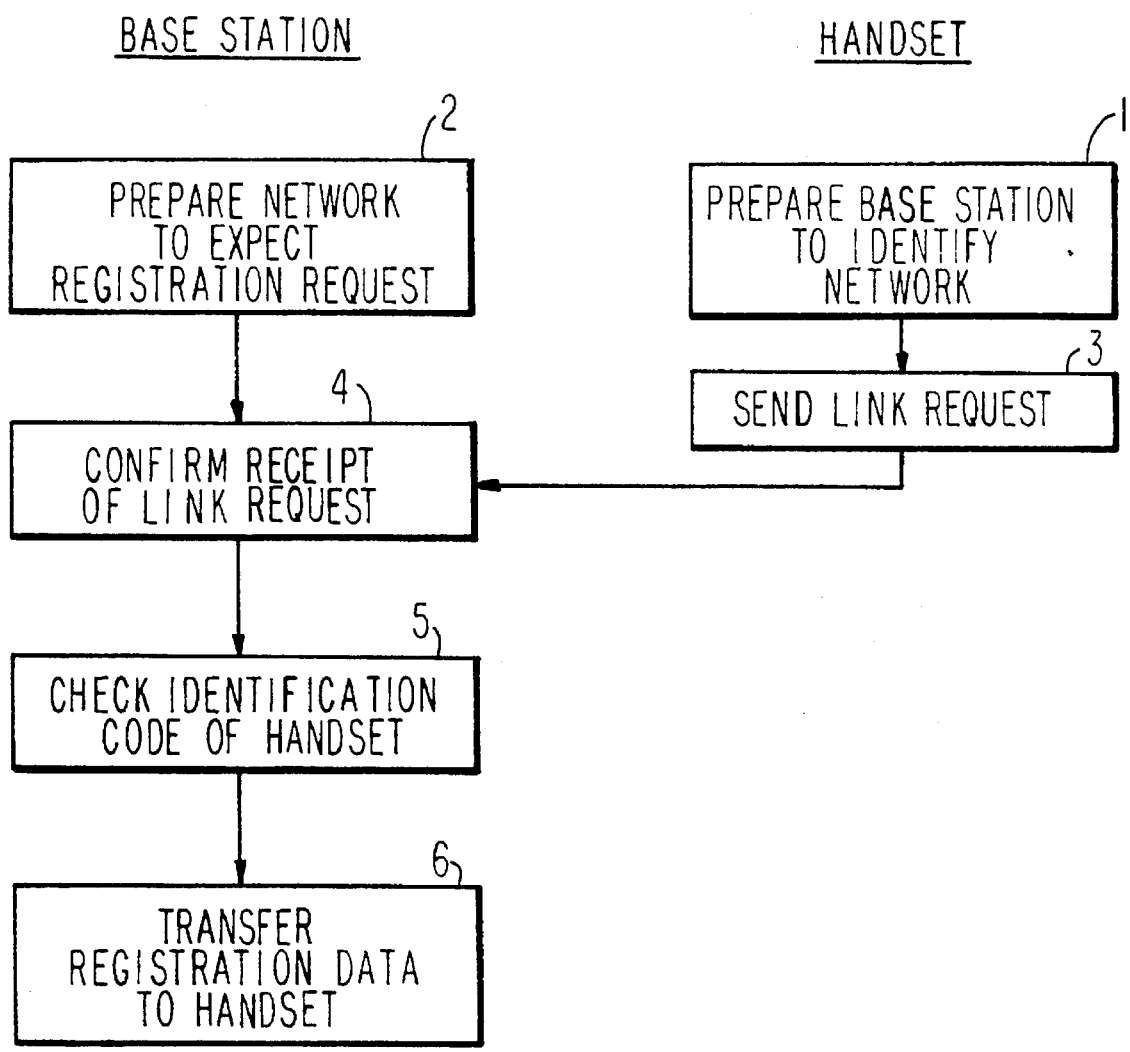

An embodiment of the present invention will now be described.

In order to overcome the above mentioned problems, it is necessary for the number of key strokes to be limited to a minimum, and to load up the bulk of the information including the ZAP data over a special air link set up between the handset and the base station. In order for this to occur the handset needs to be 'armed' at block 1 (see FIG. 1) or prepared so that it can indicate that it wants to register, and similarly, the network itself must be armed at block 2 to accept the registration request from the handset. The base station forms part of the network.

To arm the handset, firstly, a proprietary key sequence is invoked which identifies that the handset wishes to register with the network. After invoking the key sequence, special link identification values are entered into the handset. These link identification values may differ from those values used to set up the telepoint radio link.

The network is armed at block 2 by being given the handset's own unique identity number, specified during the handset's manufacture. In addition, the network's computers calculate all values described above in preparation for the request from the handset.

After the handset and network have both been armed at blocks 1 and 2 the user then locates a base station associated with the network they have joined, and presses a key sequence on the cordless handset to set up a radio link. This causes the handset to start transmitting link request code words at block 3 in signalling multiplex mode 3, commonly known as MUX3, using the link identification value previously entered.

The receiving base station recognizes the link request value, and responds after the link has been previously initialized at block 4. The handset subsequently sends a feature activation message, which is used by the base station to determine that the link is to be used for registration. The network then takes the handset's identity, and uses this to firstly check the handset has a pending registration request. If such a request at block 5 is pending, the registration details are transferred into the handset from the base station at block 6, using a proprietary reserved information element in the aforementioned Common Air Interface.

It will be appreciated that variations of the above described method can be envisaged by those skilled in the art and such variations are to be considered to be within the scope and spirit of the present invention.

We claim:

1. In a telephone network having at least one cordless telephone base station connected thereto, a method of on-air registration of a cordless telephone handset with the telephone network, the cordless telephone handset not being already registered with the telephone network, the cordless telephone handset having a unique identification number for the telephone network, the method comprising the steps of:
    a) preparing the cordless telephone handset in advance to identify the telephone network with which registration is sought;
    b) preparing the telephone network in advance to expect a registration request from the cordless telephone handset;
    c) a user of the cordless telephone handset setting up a communications link between the cordless telephone handset and the telephone network by operating the cordless telephone handset to start transmitting a link request, and the base station that receives the link request operating responsively to confirm receipt of the link request; and
    d) communicating over the communications link between the cordless telephone handset and the base station to complete the registration, including the steps of:
        (i) determining whether the registration request from the cordless telephone handset is pending by checking the unique identification number of the cordless telephone handset attempting registration, and
        (ii) automatically transferring registration data from the base station to the cordless telephone handset upon the successful determination that the registration request is pending, the registration data being permanent and independent of the base station and including the unique identification number of the cordless telephone handset.

2. The method of claim 1, wherein step (a) is performed by entering an initialization sequence into the cordless telephone handset.

3. The method of claim 1 wherein step (b) is performed by having the identification number of the handset entered into the network.

4. The method of claim 1, wherein step (c) is performed by entering an activating sequence into the cordless telephone handset to cause the cordless telephone handset to transmit link request data.

5. The method of claim 4, wherein step (c) is further performed by sending a feature activation message from the cordless telephone handset, and by the base station pending to use the feature activation message to determine that the communications link is to be used for registration.

* * * * *